United States Patent
Song (10) Patent No.: US 7,142,588 B2
(45) Date of Patent: Nov. 28, 2006

(54) MULTI-PEAK DETECTOR OF MOBILE TELECOMMUNICATION SYSTEM AND METHOD THEREOF

(75) Inventor: Jae Wook Song, Gyunggi-do (KR)

(73) Assignee: LG Electronics Inc., Seoul (KR)

( * ) Notice: Subject to any disclaimer, the term of this patent is extended or adjusted under 35 U.S.C. 154(b) by 909 days.

(21) Appl. No.: 10/026,778

(22) Filed: Dec. 27, 2001

(65) Prior Publication Data
US 2002/0155813 A1   Oct. 24, 2002

(30) Foreign Application Priority Data
Dec. 29, 2000   (KR)   ................................ 2000-84989

(51) Int. Cl.
*H04B 1/707* (2006.01)

(52) U.S. Cl. ........................ 375/150; 375/142; 375/148

(58) Field of Classification Search ................ 375/130, 375/140, 142, 143, 147, 150, 152, 316, 343; 370/320, 335, 342, 441, 479, 515; 342/378
See application file for complete search history.

(56) References Cited

U.S. PATENT DOCUMENTS

| | | | | | |
|---|---|---|---|---|---|
| 5,530,716 | A | * | 6/1996 | Lipa | ............................ 370/342 |
| 5,892,792 | A | * | 4/1999 | Walley | ........................ 375/152 |
| 5,949,828 | A | * | 9/1999 | Izumi | .......................... 375/326 |
| 2003/0128747 | A1 | * | 7/2003 | Poon et al. | .................. 375/148 |
| 2004/0170238 | A1 | * | 9/2004 | Matsuyama et al. | ......... 375/343 |

* cited by examiner

*Primary Examiner*—Kevin Kim
(74) *Attorney, Agent, or Firm*—Fleshner & Kim, LLP (57) ABSTRACT

The present invention is related to a mobile telecommunication system, and more specifically, to a multi-peak detector of the mobile telecommunication system and a method thereof for high-speed acquisition of paths necessary for a timing synchronism using a hardware multi-peak detector. The peak detector according to the present invention can include a circuit that cumulatively saves a plurality of energy values that have been calculated through a matched filter and a squarer, and a circuit that outputs several energy values out of the cumulatively saved plural energy values, which are saved based on a high-ranked enable control signal and a high-ranked mask signal.

19 Claims, 5 Drawing Sheets

Fig. 1

BACKGROUND ART

MULTI-PEAK DETECTOR OF MOBILE TELECOMMUNICATION SYSTEM AND METHOD THEREOF

BACKGROUND OF THE INVENTION

1. Field of the Invention

The present invention relates to a mobile telecommunication system. In particular, the present invention relates to a mobile telecommunication system and a method thereof for high-speed acquisition of paths by detecting and outputting a plurality of multi-peaks.

2. Background of the Related Art

In general, the signals from a sender are transmitted to a receiver using multiple communication paths or multi-path because of reflection from buildings and geographical features possible on a single communication path or transmission channel. The receiver searches a main path and a multi-path at the same time, using a pilot signal acquisition device that includes a matched filter. A detector often used in the acquisition device can be a multi-peak detector. The multi-peak detector accumulates and sorts out a plurality of energy values that have been converted by the receiver. At this time, the multi-peak detector should be equipped with one chip maskable in order to get rid of any neighboring energy values within one chip.

Figure 1:
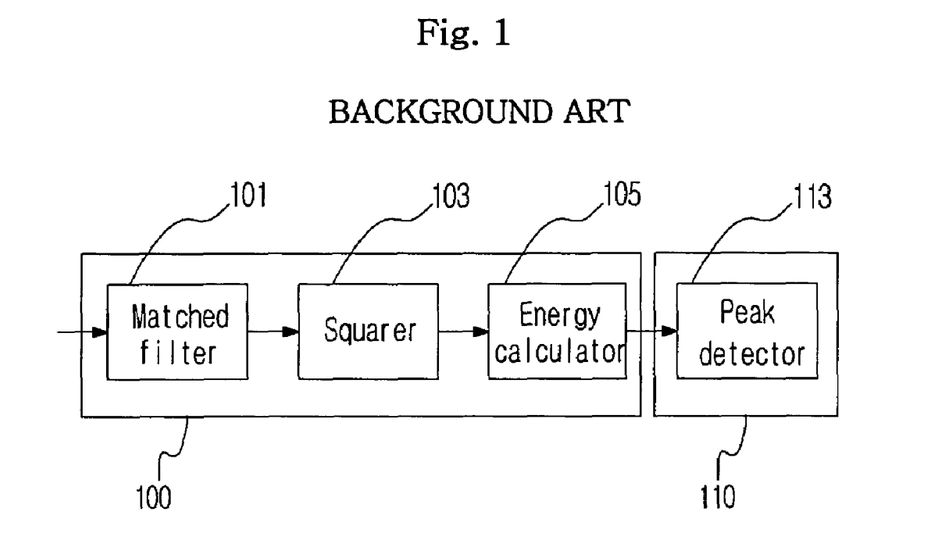
FIG. 1 is a block diagram illustrating a related art acquisition device.

FIG. 1 is a block diagram of a related art acquisition device. With reference to FIG. 1, the acquisition device provides a matched filter 101 with the signals having I and Q components that are inputted at the receiving end. The matched filter 101 then calculates the despreading value on each I and Q component signals, and provides the result to a squarer 103. The squarer 103 sends the energy value obtained through squaring and adding the despreading value to an energy calculator 105. The energy calculator 105 adds a previous energy value to a current energy value inputted in sequence and saves the sum. A peak detector 113 reads a number of the energy values that are saved cumulatively into the energy calculator 105 one by one, and detects an energy value having the highest peak value.

The matched filter 101, the squarer 103 and the energy calculator 105 in the acquisition device constitute hardware 100, and the peak detector 113 constitutes software 110. However, the related art multi-peak detector of FIG. 1 has numerous energy values that are usually calculated by the hardware, and the software including the multi-peak detector 113 has to spend a great deal of time to read corresponding code phases and to sort and decide. A Code Division Multiple Access (CDMA) system that has very complex functions cannot sufficiently allocate the processing speed of the software for energy detection, and accordingly, the software cannot complete the peak detection within a short period of time.

For example, suppose that the resolution for search during a slot synchronizing procedure of acquisition step 1 as defined in the W-CDMA mobile telecommunication system is ½chip, and the total number of code phase is 5120. In a case where the related art multi-peak software is used, the software had to read every code phase, and perform the sorting and the masking for 5120 code phases, respectively. To do so, a large number of slots are used, and other functions of the CDMA modem are significantly delayed or come to a halt during the operation. Further, deciding the peak energy value by reading up to 5120 code phases by a single software is not that practical in itself.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a multi-peak detector and method for using same of a mobile telecommunication system for acquisition of a timing synchronism.

Another object of the present invention is to provide a multi-peak detector of a mobile telecommunication system and method thereof that configures the peak detector to be hardware instead of software as in the related art.

Another object of the present invention is to provide a multi-peak detector of a mobile telecommunication system and method thereof having a plurality of peak detectors in order to be able to output energy to a corresponding position to an amplitude of the energy.

Another object of the present invention is to provide a multi-peak detector of a mobile telecommunication system having a plurality of maskable registers in order to improve resolution in search.

Another object of the present invention is to provide a multi-peak detection method of a mobile telecommunication system.

Another object of the present invention is to provide a multi-peak detector of a mobile telecommunication system and method thereof for acquisition of a path for a timing synchronism by detecting and outputting a plurality of multi-peaks using mask signals and enable control signals.

To achieve at least the above objects in a whole or in part, the present invention provides a multi-peak detection method of a communication system using a plurality of energy values calculated through despreading a plurality I and Q component signals that are inputted into the communication system, the method including accumulating the plurality of energy values, sequentially receiving the accumulated energy values in a prescribed order for comparison with previous energy values, generating a mask signal from the comparison, deciding whether to save the accumulated energy values based on a high-ranked mask signal, and outputting a plurality of ranked energy values.

To further achieve the above objects in a whole or in part, the present invention provides a multi-peak detection method of a mobile telecommunication system including (a) receiving a single energy value out of a plurality of energy values through a clock signal, (b) deciding whether to save the input energy by comparing the input energy with a previous energy value in a first peak detector, (c) outputting a mask signal from a second peak detector based on the comparison result of the input energy value and the previous energy value, (d) deciding an enable status of a register based on a high-ranked mask signal, (e) saving either the input energy value or the high-ranked energy value in the register based on the high-ranked enable control signal, if the register turns out to be in an enable status, (f) repeating the steps (c) through (e) for a next peak detector up to the Mth peak detector, (g) receiving energy values per clock signal, while repeating the steps (b) through (f) up to the Nth energy value, and (h) outputting the energy values saved in every register, if the peak detection is completed up to the Nth energy value.

In accordance with the multi-peak detection method of a mobile telecommunication system described above, one energy value out of the numerous energy values is saved in the first peak detector And, on the basis of the saved energy, if an input energy coming before or after 1 clock is smaller than the saved energy, the input energy before or after I clock can be masked out.

To further achieve the above objects in a whole or in part, the present invention provides a multi-peak detector of a mobile telecommunication system, including device for cumulatively saving a plurality of energy values that are calculated by a matched filter and a squarer, and device for outputting newly saved plural energy values out of the accumulated plural energy values, the new energy values being selected based on a high-ranked mask signal and a high-ranked enable control signal.

To further achieve the above objects in a whole or in part, the present invention provides an acquisition device in a mobile communication system, including a filter coupled to receive a plurality of input signals and output despreading values, an energy calculator circuit that receives the despreading values and cumulatively stores a corresponding plurality of energy values, and a multi-peak detector that receives the plurality of energy values and outputs a ranked plurality of M energy values, wherein the multi-peak detector has M peak detectors, wherein at least one of the peak detectors includes a delayer that receives a clock signal and a high-ranked mask signal, a comparator that receives an input energy value and a first previous energy value and outputs a first control signal, a first multiplexer that receives the input value and a second previous energy value, a first register connected to receive an output of the first multiplexer, the clock signal and an enable control signal, and an enable controller that receives an output from the comparator, a delayed high-ranked mask signal from the delayer and a mask signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Preferred embodiments of the present invention will now be described with reference to the accompanying drawings. The matters defined in the description are nothing but the ones provided to assist in a comprehensive understanding of preferred embodiments according to the present invention. Thus, it is apparent that the present invention can be carried out without those defined matters. Also, well-known functions or constructions are not described in detail.

Figure 2:
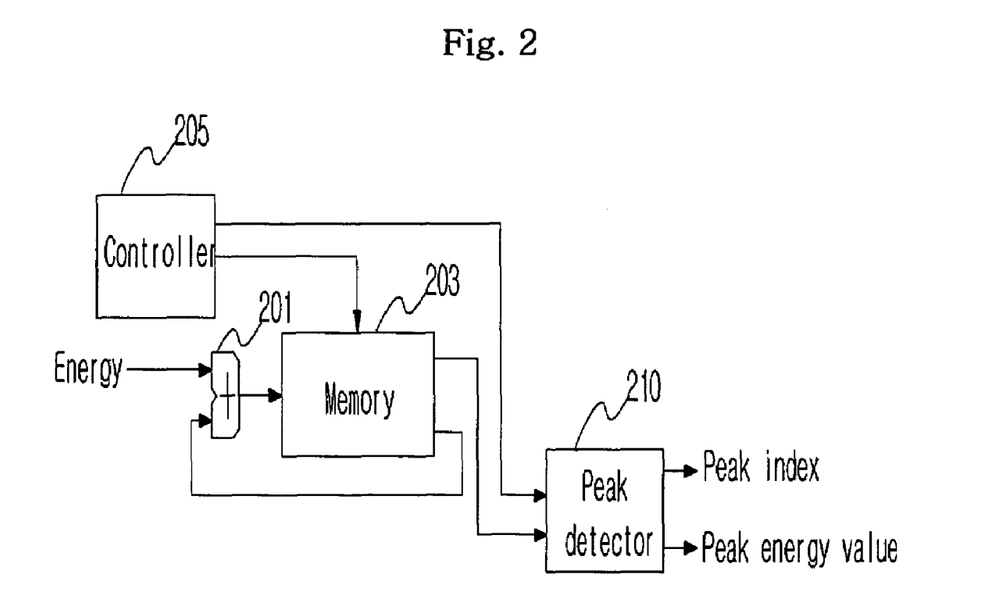
FIG. 2 is a block diagram illustrating a preferred embodiment of an acquisition device in accordance with the present invention.

FIG. 2 is a block diagram illustrating a preferred embodiment of an acquisition device in accordance with the present invention. As described above, since the related art peak detector is software, much time is needed to detect peak values out of a large number of energy values that are cumulatively saved in an energy calculator. To reduce or solve at least that problem, the preferred embodiments of an acquisition device can place a peak detector in hardware. As shown in FIG. 2, the energy value outputted from a squarer (not shown) is inputted to an adder 201 to be added to a previous energy value. The adder 201 then saves the sum of the energy values in a memory 203. When the energy value that is outputted from the adder 201 is saved in the memory 203, a controller 205 can assign an index to the energy value. Accordingly, the energy value can be saved in the memory 203 corresponding to the given index. In short, the numerous energy values inputted in the adder 201 are added to the previous energy value, and the sum of the energy values together with the index assigned by the controller 205 are saved in the memory 203. Such operations can be carried out continuously on a constant time basis through a control signal from the controller 205.

The energy values saved in the memory 203 are preferably inputted one by one into the peak detector 210 according to a clock signal from the controller 205. When the energy values are inputted in the peak detector 210, the indexes assigned to the energy values are preferably also provided to the peak detector 210. The controller 205, on the other hand, preferably provides the peak detector 210 with an initiation signal on a constant time basis in order for the peak detector 210 to sort out the energy values that have been accumulated in the memory 203 on a constant time basis. The peak detector 210 is then able to accomplish the initiation using the initiation signal.

It is possible to have a plurality of peak detectors 210 for discarding the numerous energy values that have been accumulated for a prescribed interval or given time period, and for outputting the energy values in order of magnitude. But before describing plural peak detectors, a single peak detector will now be described with reference to FIG. 3.

Figure 3:
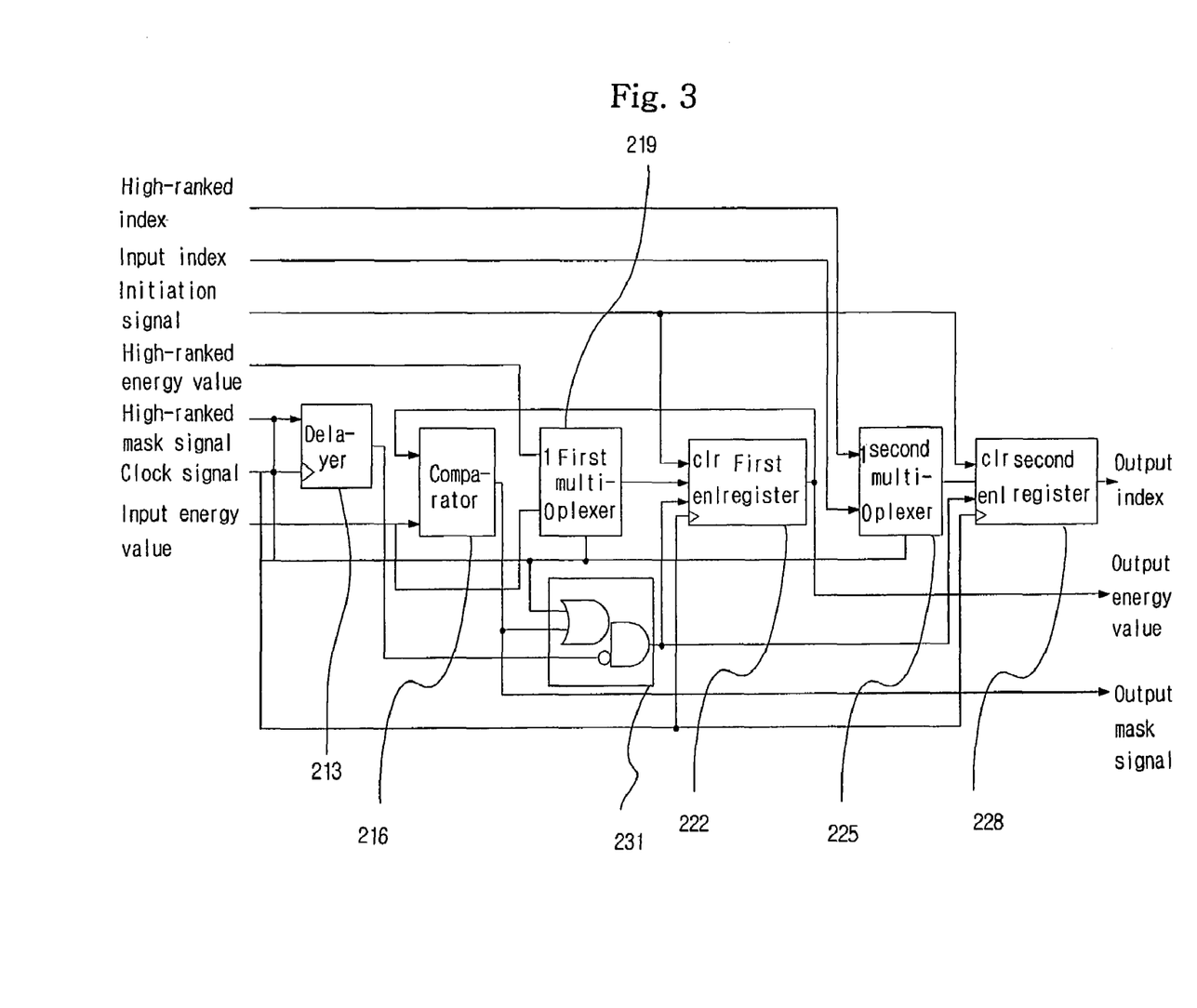
FIG. 3 is a block diagram illustrating a peak detector in FIG. 2.
Figure 4:
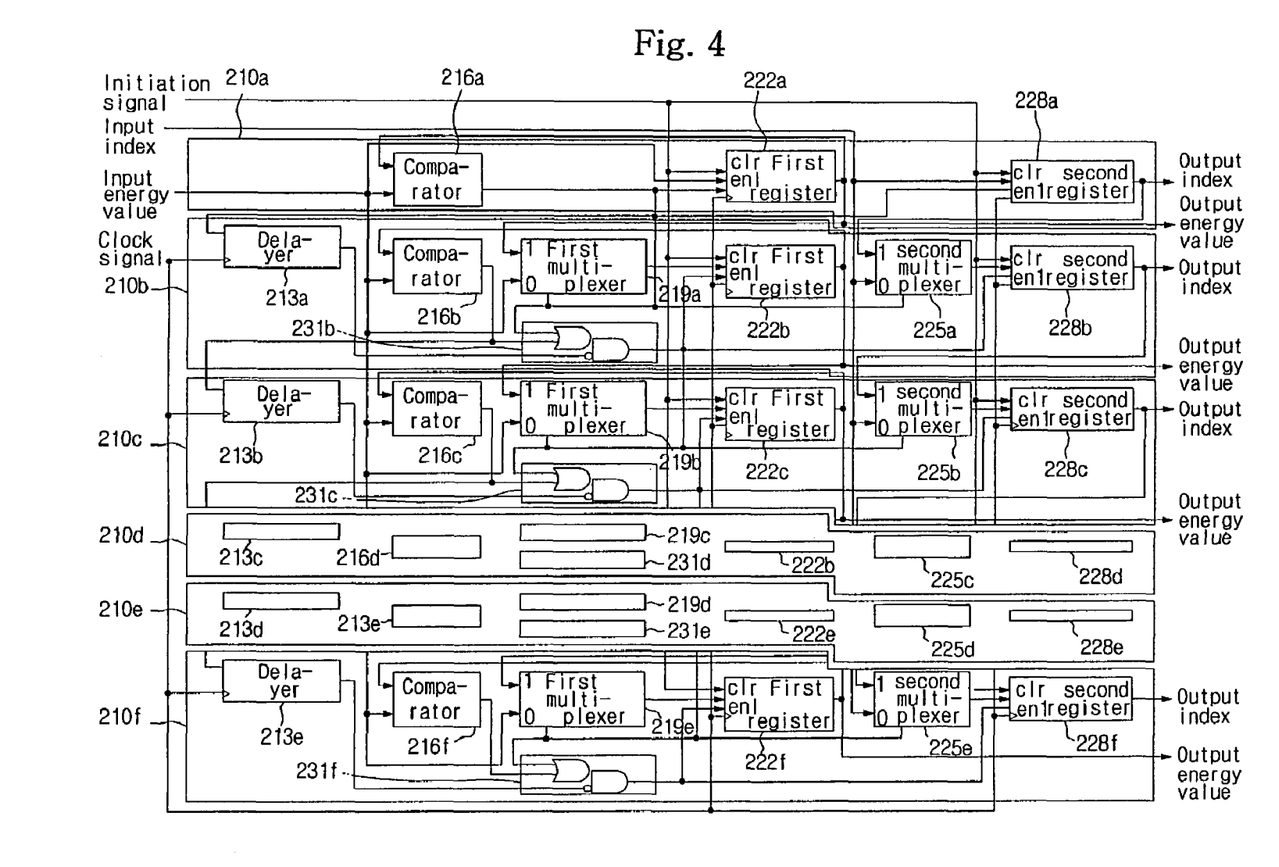
FIG. 4 is a block diagram illustrating a plurality of peak detectors in the acquisition device in FIG. 3.

FIG. 3 is detailed block diagram of a peak detector that can be used for the peak detector 210. As shown in FIG. 3, the peak detector includes a delayer 213, a comparator 216, a first multiplexer 219, a first register 222, a second multiplexer 225, a second register 228 and an enable controller 231. As shown in FIG. 3, the initiation signal is provided by the controller 205 for sorting out the plural energy values on a constant time basis. The clock signal serves to operate the delayer 213, the first register 222 and the second register 228. Also, the clock signal can operate to input the accumulated plural energy values in the memory into the peak detector one by one. That is to say, whenever the clock signal is generated, the plural energy values can be provided to the peak detector one by one. As shown in FIGS. 3 and 4, a first peak detector 210*a* preferably outputs signals, such as a high-ranked index, a high-ranked energy and a high-ranked mask signal, when a second peak detector 210b detects the energy value as shown in FIG. 4. The high-ranked energy value is preferably saved in the first register 222a, and the high-ranked index is saved in the second register 228a, and the high-ranked mask signal is outputted from a first comparator 216a.

As shown in FIG. 3, the delayer 213 retains the high-ranked mask signal, e.g., '1' or '0' and whenever the clock signal is generated, the delayer 213 provides the high-ranked mask signal to the enable controller 231. Preferably, the delayer 213 is a 1-bit register.

The comparator 216 compares the input energy value with the present energy value that is saved in the first register 222 (hereafter, it is referred to as 'the previous energy value'), and outputs '1' or '0' signal (hereafter, it is referred to as 'the mask signal') based on the comparison result. The mask signal outputted from the comparator 216 is provided to the enable controller 231.

In accordance with the high-ranked mask signal described above, the first multiplexer 219 selects the input energy value or the high-ranked energy value (e.g., the previous energy value), and then provides it to the first register 222. For example, the first multiplexer 219 selects the input energy value if the mask signal is '0' and selects the high-ranked energy value if the mask signal is '1'. Then, the energy signal selected is provided to the first register 222.

The first register 222 saves the energy values that are selected by the first multiplexer 219. At this time, the first register 222 should be enabled. That is, according to the control signal, (e.g., '1' or '0') outputted from the enable controller 231, the first register 222 can be enabled or disabled. In more detail, if the control signal is '1', the first register 222 is preferably enabled to save the energy value that is selected by the first multiplexer 219. On the contrary, if the control signal is '0', the first register 222 is disabled, and the energy value selected by the first multiplexer 219 cannot be saved.

As shown in FIG. 3, in accordance with the high-ranked mask signal, the second multiplexer 225 selects the input index or the high-ranked index, and provides the selected index to the second register 228. For example, if the mask signal is '0', the second multiplexer 225 selects the input index and provides the input index to the second register 228. If the mask signal is '1', the second register 228 selects the high-ranked index, and provides the high-ranked index to the second register 228. Depending on the high-ranked mask signal, the second multiplexer 225 selects one index, and the selected index is provided to the second register 228. Of course, the second register 228 should be enabled to be able to save the index that has been outputted from the second multiplexer 225 in the second register 228. In addition, the enable state of the second register 228 is preferably determined by the control signal from the enable controller 231. For example, when the control signal from the enable controller 231 is '1', the second register 228 is enabled in order to save the index. However, when the control signal is '0', the second register 228 is disabled, and the index selected by the second multiplexer 225 cannot be saved.

As described above, the enable controller 231 decides whether to save the energy value or the index that corresponds to the first register 222 and the second register 228. Preferably, the control signal from the enable controller 231 is determined by the high-ranked mask signal outputted from the delayer 213, or the mask signal outputted from the comparator 216. However, the control signal tends to be more dependent on the high-ranked mask signal that is outputted from the delayer 213.

As shown in FIG. 3, the exemplary enable controller 231 includes a NOT gate for changing the high-ranked mask signal outputted from the delayer 213 to an opposite signal, and an OR gate for outputting a high-level control signal (e.g., '1'), if one of the mask signal or the high-ranked mask signal takes the high-level signal (e.g., '1') through the OR operation on the mask signal and the high-ranked mask signal. The exemplary enable controller 231 can also include an AND gate for outputting the control signal (high-level (e.g., '1')), only if the each signal that is inputted from the NOT gate and the OR gate, respectively, is both low level or '0'. Therefore, if the delayer 213 outputs the delayed high-ranked mask signal '1', the high-ranked mask signal is converted to '0' by the NOT gate, and is inputted to the AND gate. In this case, the signal from the AND gate, or the control signal of the enable controller 231, becomes '0' all the time regardless of the output signal from the OR gate, and the first register 222 and the second register 228 can be disabled, respectively. Meanwhile, when the delayer 213 outputs the low-level delayed high-ranked mask signal '0', the NOT gate inputs the control signal '1' in the AND gate. Accordingly, if at least one control signal '1' is inputted in the OR gate, the enable controller 231 outputs the control signal '1', which consequently enables each register 222 and 228. Thus, the enable controller 231 preferably determines the control signal to be outputted based on the result of the delayed high-ranked mask signal that is outputted from the delayer 213.

In summary, the peak detector as shown in FIG. 3 can save the corresponding energy value and the index to the first register 222 and the second register 228, respectively, according to the high-ranked mask signal from the delayer 213. Under such conditions that the energy value and the index can be saved in the first register 222 and the second register 228, and that both registers 222 and 228 can be selectively enabled, the peak detector respectively selects one energy value or an index in each multiplexer 219 and 225, based on the high-ranked mask signal, and saves the selected energy value or index in each register 222 or 228. Moreover, based on the comparison result from the comparator 216 that compares the input energy value and the previous energy value, the peak detector can create the next mask signal.

The peak detector illustrated in FIG. 3 can couple together several additional peak detectors. FIG. 4 is a block illustrating a plurality of peak detectors coupled to each other. As shown in FIG. 4, six (6) peak detectors are coupled to each other, however the present invention is not intended to be so limited.

As shown in FIG. 4, each peak detector preferably includes the configuration of the peak detector shown in FIG. 3, except that a first peak detector 210a does not include the delayer, the first multiplexer, the second multiplexer and the enable controller. However, based on a comparison result of a comparator 216a, the first peak detector 210a decides whether to save the energy value and the index corresponding to a first register 222a and a second register 228a, respectively. Since the first register 222a and the second register 228a are preferably enabled or disabled based on the comparison result from the comparator 216a, the first peak detector 210a does not require of the enable controller or the delayer. However, the peak detectors from the second peak detector on preferably need the delayer, the first multiplexer, the second multiplexer and the enable controller, or functions thereof in order to decide whether to respectively save the energy value and the index in each corresponding register.

The following example illustrates the case of saving the energy value and the index by using a plurality of peak detectors according to one preferred embodiment of the present invention. In the example, assume that the input energy value, the index and the clock have the values shown in Table 1.

TABLE 1

| Clock Signal | Clock 1 | Clock 2 | Clock 3 | Clock 4 | Clock 5 |
|---|---|---|---|---|---|
| Index | 1 | 2 | 3 | 4 | 5 |
| Energy value | 70 | 60 | 80 | 100 | 95 |

As shown in Table 1, the energy values that are cumulatively saved in a memory are 70, 60, 80, 100, and 95. The energy values are designated by the clock signals to be inputted on the ½chip basis. When the energy values are cumulatively saved in the memory, the index is assigned to each energy value corresponding to the order of accumulation of the energy values. Lastly, the clock signal is generated by the controller. Whenever the clock signal is generated, the first arrived index and the energy value are provided to the peak detector. The input energy values are total 5, and thus 5 peak detectors are preferably needed.

It is important that the initiation signal should be provided to the peak detector of FIG. 4 before the controller generates the first clock signal, in order to 'zero' or get rid of all energy values and the index values saved in registers (e.g., each register 222a through 222f, and 228a through 228f, respectively). In the example, once all the registers 222a through 222f and 228a through 228f are initiated by the initiation signal, the controller generates the clock 1 signal, and accordingly, the index 1 and the input energy 70 are inputted in the first peak detector 210a. The comparator 216a in the first peak detector 210a compares the input energy value and the previous energy value that has been saved in the first register 222a. At this time, since the first register 222a is initiated by the initiation signal, the previous energy value becomes zero. Since the input energy value is greater than the previous energy value, the comparator 216a outputs the signal '1', and according to the control signal '1', the first register 222a is enabled. Then, the first peak detector 210a saves the input energy 70 in the first register 222a, and at the same time, saves the index 1 in the second register 228a. Moreover, the signal '1', outputted from the comparator 216a, is temporarily saved in the delayer 213a in the second peak detector 210b, and concurrently it can also be used as a selection signal for the first multiplexer 219a and the second multiplexer 225a.

The comparator 216b in the second peak detector 210b, similar to the comparator 216a in the first peak detector 210a, compares the input energy value with the previous energy value that is saved in the first register 222b. As a result, the previous energy value saved in the first register 222b becomes zero. When comparing the two energy values, since the input energy value is greater than the previous energy value, the comparator 216b outputs the signal '1', and provides the control signal '1' to the enable controller 231b and the delayer 213b, which is in the third peak detector 210c.

On the other hand, when the signal '0' from the delayer 213a is inputted and then converted to the signal '1' by the NOT gate, the enable controller 231b then inputs the signal '1' in the AND gate. In the meantime, if the comparator 216b outputs the signal '1', which is later inputted in the OR gate, the enable controller 231b then outputs the control signal '1', and eventually the first register 222b and the second register 228b are enabled. In accordance with the signal '1', outputted from the first comparator 216a in the first peak detector 210a, the first multiplexer 219a and the second multiplexer 225a, respectively, select a high-ranked energy value and a high-ranked index, and the two values are saved in both registers 222b and 228b. Here, the high-ranked energy value and the high-ranked index mean the energy value and the index that are saved in the first register 222a and the second register 228a, respectively. However, since the first register 222a and the second register 228a have been already initiated as '0', the values do not exist in both registers. Hence, each register, 222b or 228b, of the second peak detector 210b has neither value. Automatically, the third peak detector, the fourth detector, and the fifth peak detector, that operate similar to the second peak detector, do not have the values, but remain empty instead. Thus, if the energy value of 70 is initially inputted, the value is inputted in the first peak detector 210a and the first register 222a. Then the index '1' is inputted in the second register 228a, leaving the other peak detectors, 210b through 210e, empty. It should be noted that although the operations of each peak detector, 210a through 210e, have been described in consecutive order. However, the peak detectors according to preferred embodiments of the present invention are preferably operated in parallel.

Continuing the example, when the second clock signal is generated, the energy value 60 and the index 2 from Table 1 are inputted. Then, the first peak detector 210a compares the previous energy value of 70 with the input energy value of 60. Since the previous energy is greater than the input energy value, the control signal '0' is outputted, and saved in the delayer 213a in the second peak detector 210b. And, the first register 222a and the second register 228a are disabled since the mask signal from the comparator 216a is '0'. Accordingly, the energy value 60 and the index 2 are not saved in each register, 222a and 228a.

The mask signal '1', saved in the delayer 213a of the second peak detector 210b is inputted in the enable controller 231a, converted to '0' by the NOT gate, and finally inputted in the AND gate. Therefore, the enable controller 231a, regardless of the input signal into the OR gate, outputs the control signal '0', and according to the signal, each register 222b and 228b are disabled, not being able to save the input energy. The input energy value 60 is preferably discarded because it is within one chip in terms of timing based on the energy value 70. It is called 1-chip maskability. According to the 1-chip maskability function, once a single energy value existing within one chip is selected, the other energy values are inevitably discarded. The comparator 216b in the second peak detector 210b compares the input energy value 60 and the previous energy value 0, and at the result of the comparison, the mask signal '1', is outputted, which is eventually saved in the delayer 213b in the third peak detector 210c. In the meantime, the remaining peak detectors, i.e., 210c through 210e, perform the same operation with that of the second peak detector 210b, meaning that none of the registers, 222b through 222e and 228b through 228e, saves the energy value 60 or the corresponding index.

Continuing the example, when the third clock signal is generated, the energy value 80 and the index 3 are inputted. Then the comparator 216a in the first peak detector 210a compares the input energy 80 and the previous energy value 70. At the result of the comparison, the mask signal '1', is outputted. While enabling each register 222a and 228a, the signal is saved in the delayer 213a in the second peak detector 210b at the same time. In line with the mask signal '1' from the comparator 216a, the input energy value 80 and the index 3 are saved in the corresponding registers, 222a and 228b.

In the second peak detector 210b, the mask signal '0' saved in the delayer 213a is outputted according to the second clock signal, and the control signal '1', is outputted from the enable controller 231a according to the mask signal. As a result, each register, 222b and 228b, is enabled. At this time, since the comparator 216a in the first peak detector 210a outputted the mask signal '1', each multiplexer, 219a and 225a, selects 1, thereby making the high-ranked energy value 70 and the index 2 to be saved in each register, 222b and 228b. After comparing the input energy value 80 with the previous energy value 0, the comparator 216b outputs the mask signal '1', and the delayer 213b in the third peak detector 210c then saves the mask signal '1'.

However, since the delayer 213b in the third peak detector 210c already retains the mask signal '1', according to the second clock signal before, the enable controller 231b outputs the control signal '0', disabling each register 222c and 228c. Thus, the input energy value or the high-ranked energy value cannot be saved in both registers. Similarly, the fourth peak detector 210d, and the fifth peak detector 210e, whose operations are in harmony with the third peak detector 210c, do not respectively save any energy value and the index value in their registers, 222d, 222e, 228d and 228e.

Continuing the example, if the energy value 100 and the index 4 are inputted according to the fourth clock signal, the first peak detector 210a compares the input energy value 100 with the previous energy value 80. In result, the mask signal '1' is outputted. Consequently, each register 222a and 228a, is enabled and at the same time, the mask signal '1', is saved in the delayer 213a in the second peak detector 210b. Then, the energy value 100 and the index 4 can be saved in each register 222a and 228a.

The delayer 213a in the second peak detector 210b provides the mask signal '1' to the enable controller 231a. Then, according to the control signal '0' outputted from the enable controller 231a disables each register, 222b and 228b. Thus, the registers 222b and 228b cannot save the input energy value or the high-ranked energy value, discarding the high-ranked energy value of 80 after all. The high-ranked energy value of 80 is masked out by the second peak detector 210b because it is within one chip based on the input energy value of 100. On the other hand, the comparator 216b compares the input energy value of 100 and the previous energy value of 70, and outputs the mask signal '1'. The mask signal '1' is then saved in the delayer 213b in the third peak detector 210c. Similar to the second peak detector 210b, the following peak detectors, 210c, 210d, and 210e, do not save the input energy of 100 and the index 4 in each register, 222c through 222e and 228c through 228e.

Continuing the example, if input energy value of 95 and the index 5 are inputted according to the fifth clock signal, the comparator 216a in the first peak detector 210a outputs the mask signal '0'. Thus, each register, 222a and 228a, is disabled, not being able to save the input energy value of 95 and the index 5. Also, the mask signal '0' is saved in the delayer 213a in the second peak detector 210b.

The delayer 213a in the second peak detector 210b outputs the mask signal '1', and according to the mask signal, the enable controller 231b outputs the control signal '0'. Again, each register, 222b and 228b, is disabled and cannot save the input energy value of 95 or the high-ranked energy value of 100. Meanwhile, the comparator 216b compares the input energy value of 95 and the previous energy value of 70, and in result, the mask signal '1' is saved in the delayer 213b in the third peak detector 210c. Automatically, the following peak detectors, 210d through 210e, do not save the input energy value 95, and mark out the subject energy value instead. The input energy value 95 is discarded because it is within one chip of the high-ranked energy value of 100.

In the example described above with respect to Table 1, when the energy values, 70, 60, 80, 100 and 95 are inputted in the peak detector one by one according to the corresponding clock signal, the highest energy value is saved in the first peak detector 210a, and the other values are saved in the next corresponding peak detectors, 210b through 210e. In addition, on the basis of only a single energy value within one chip preferably being selected, if the former or latter energy value of the selected energy value happens to be within one chip, the former or latter energy value is discarded or masked out. As described above, suppose that the first energy value inputted is 70. If the next energy value is 60, it is discarded because it is within one chip of the energy value 70. In another case, when the fourth energy value of 100 is selected as the basis, the former energy value of 80 or the latter energy value of 95 are each discarded because they are within one-chip of the energy value 100. Therefore, the final energy values in the example using Table 1 would preferably be the energy value 100 from the first peak detector 210a and the energy value 70 from the second peak detector 210b, and each final energy value is outputted together with the corresponding index, respectively.

In order to improve the search resolution, preferred embodiments according to the present invention can provide a plurality of delayers that are coupled to each other in parallel. Such delayers can include an OR gate for performing the OR operation from the delayers that are coupled to each other in parallel.

Figure 5:
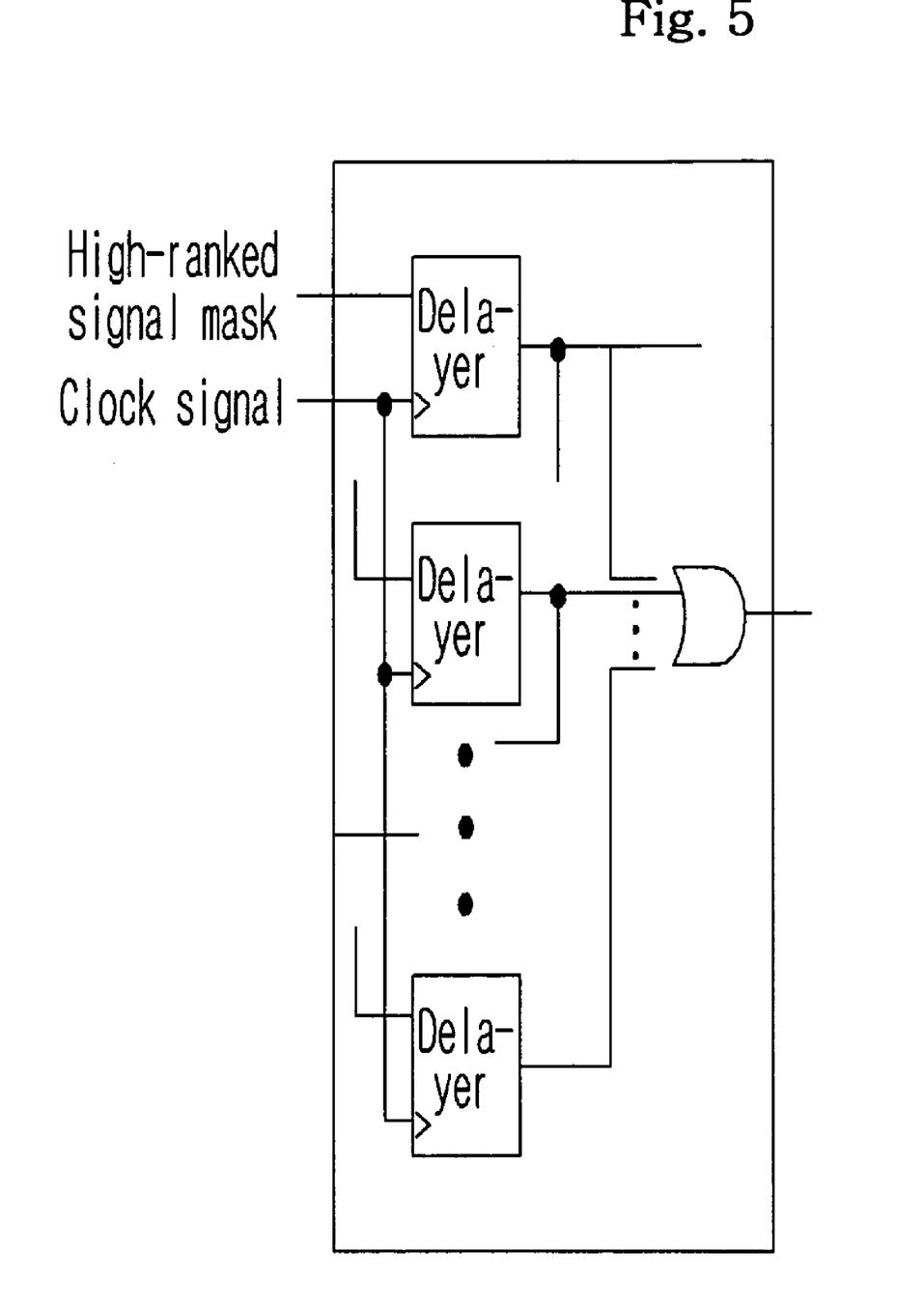
FIG. 5 is a block diagram illustrating a plurality of delayers in the acquisition device in FIG. 3.

FIG. 5 is a block diagram showing a preferred embodiment of plurality of delayers coupled to each other. The preferred embodiment of a plurality of delayers can be used in the peak detectors of FIGS. 2–4. As shown in FIG. 5, in the delayer 213, preferably the outputs from a first delayer 214a are inputted to a second delayer 214b, and the outputs from the second delayer 214b are inputted to the third delayer 214c, etc. Accordingly, a desired number of delayers 213 can be connected in parallel. Moreover, each delayer, 214a through 214n, outputs either signal '1' or signal '0' depending on the OR operation of the OR gate 215.

Therefore, the main role of the OR gate 215 is to perform the OR operation on all the output signals of the first delayer 214a and the output signals that were previously saved in the other delayers, 214b through 214n, and to output a single signal at the end. The output signal of the remaining delayers 214b through 214(n−1) is saved in the following parallel delayers, 214c through 214n, respectively.

Figure 6:
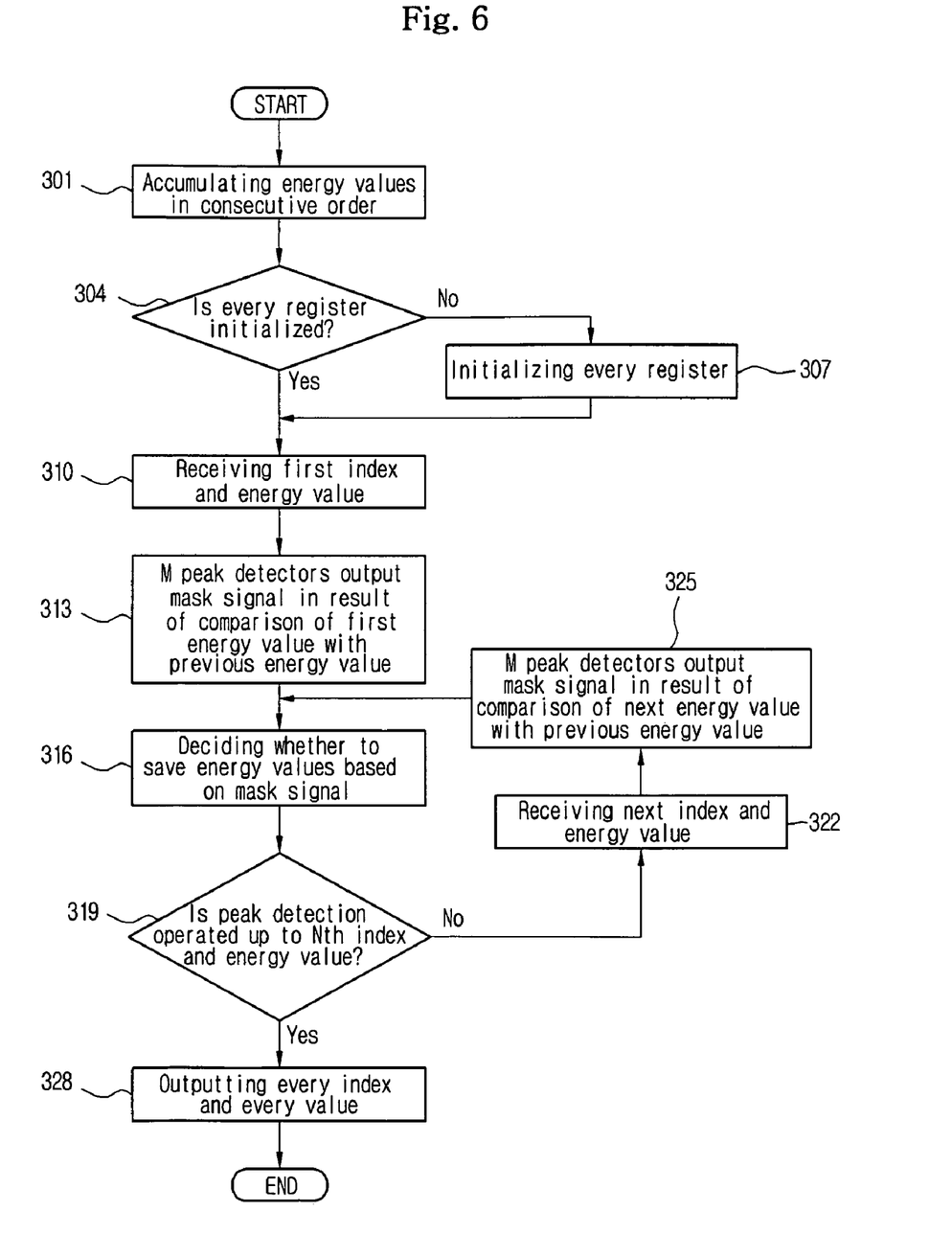
FIG. 6 is a flow chart that shows a preferred embodiment of a method for detecting an energy peak in the acquisition device in accordance with the present invention.

FIG. 6 is a flow chart that shows a preferred embodiment of energy peak detection method in accordance with the present invention. The preferred embodiment of an energy peak detector method can be used, for example, in the preferred embodiment of an acquisition device shown in FIG. 4. As described above, the acquisition device includes the matched filter, the squarer, the energy calculator, and the multi-peak detector. Based on a plurality of I and Q component signals inputted from the receiving end, the acquisition device outputs energy values that went through the matched filter and the squarer. Since the procedures involved to this point are similar to the related art method, the energy peak (e.g., multi-peak) detection method detailed description starts from a next procedure.

As shown in FIG. 6, a plurality of energy values that have been outputted from the squarer in consecutive order are cumulatively saved preferably in a memory of the energy calculator one by one (step 301). That is, each energy value is added to the energy values in the memory. Also, each energy value can be saved together with the corresponding index provided by the controller.

The controller confirms whether each register of the peak detector has been initiated (step 304). If the registers are not yet initiated, the controller outputs the initiation signal to the peak detector to initiate the registers (step 307).

If it is determined that each register is already initiated (step 304), the peak detector receives the first index and energy value from the memory in accordance with the first clock signal from the controller (step 310). To do so, the peak detector is preferably able to detect a number of energy values out of the cumulatively saved energy values in the memory. That is to say, if N energy values (N is the number of energy values) are saved in the memory, M (M<N) peak detectors (M is the number of peak detectors) are required to detect or receive the N energy values in consecutive order.

The M peak detectors compare the first energy value with the previous energy value, and generate the mask signal (e.g., '1' or '0') based on the comparison result (step 313). The mask signal is saved in the delayer of the next subordinate peak detector (e.g., sequential) of the M peak detectors. When the second energy value and the index are inputted, the mask signal is saved in the enable controller and preferably used later for deciding whether to save the energy value and the index (step 316). If it is possible to save the energy value and the index by the enable controller, the multiplexer selects one energy value and one index according to the mask signal, and save the values in each register. At this time, the energy value to be saved can be either the first energy value or the second energy value.

In peak detectors other than the first peak detector, the mask signal outputted from the comparator in each peak detector is preferably saved in the enable controller, and the mask signal that has been previously saved in the delayer in each peak detector is the one that determines whether to save the energy value and the index. On the contrary, in the case of the first peak detector, the mask signal outputted from the comparator preferably determines whether to save the energy value and the index.

Based on the comparison result provided by the comparator, the first peak detector can enable or disable each register, which further decides whether to save the first index and the first energy value or not. In addition, as the next clock signal is generated, the first peak detector might save the mask signal that has been outputted from the comparator in the delayer of the second peak detector in order for the second peak detector to decide whether to save the index and the energy value.

The second peak detector then provides the mask signal saved in the delayer to the enable controller, and the enable controller outputs the control signal, enabling or disabling each register. Afterwards, the second peak detector selects the corresponding energy value and the index based on the mask signal that has been outputted from the first peak detector, and saves the values in each register. Additional peak detectors of the M peak detectors perform the same operation with the second peak detector, and decide whether to save the energy value and the index. The remaining peak detectors preferably having a second register use their own comparator to save the mask signal in the delayer of the next peak detector. As described above, when a new index and an index are inputted according to the clock signal, the mask signal saved in the delayer of the next peak detector is provided to the enable controller, and can be used for deciding whether to save the energy value and the index.

Using the steps 310, 313, and 316, the first energy value and the index can be saved in each peak detector according to the control signal from the enable control signal using the mask signal, and such operations can go all the way through the last energy value, that is, the Nth index and energy value. In other words, the controller confirms whether the peak detection operation on the Nth index and energy value are properly accomplished (step 319). If the peak detection is not yet accomplished in the Nth index and energy value (step 319), the controller generates the clock signal and the next index and the energy value are provided to the peak detector.

Upon receiving the next index and the energy value (step 322), the peak detector outputs the mask signal (e.g., '1' or '2') based on the comparison result of the next energy value with the previous energy value (step 325). The mask signal can be outputted from M comparators (M is the number of the comparators). The mask signal outputted from each comparator is saved in the delayer of the subordinate peak detector, and use for deciding whether to save the energy value in case the next clock signal is generated. If the next clock signal is generated, step 316 is repeated, that is to say, it is decided whether to save the energy value or not based on the mask signal.

If it is determined that the peak detection was operated on the Nth index and energy value in the step 319, final index values and final energy values that are saved in the plural peak detectors are outputted (step 328).

In a case that other N indexes and energy values (N is the number of indexes or th energy values) are inputted in the plural peak detectors, the same operations described above can be repeated, and finally detected indexes and corresponding energy values can be outputted.

As described above, preferred embodiments of acquisition devices and methods of detecting an energy peak thereof according to the present invention have various andvantages. The preferred embodiments provide faster timing synchronization. In making the peak detector to be a part of hardware according to the preferred embodiments, a timing synchronism can be acquired faster. Further, on the basis of an input energy, if a next input energy value is within 1 chip, the next input energy can be masked out depending on a mask signal.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A multi-peak detection method of a communication system using a plurality of energy values calculated through despreading a plurality I and Q component signals that are inputted into the communication system, the method comprising:

accumulating the plurality of energy values;
sequentially receiving the accumulated energy values in a prescribed order for comparison;
generating a mask signal from the comparison;
deciding whether to save the accumulated energy values based on a high-ranked mask signal; and
outputting a plurality of ranked energy values.

2. The method according to claim 1, wherein the accumulated energy values are received in consecutive order whenever a clock signal is generated.

3. The method according to claim 1, wherein the generating the mask signal and the deciding to save the accumulated energy values are operated at an interval of one clock.

4. The method according to claim 1, wherein the high-ranked mask signal is a signal that has been generated and saved during a previous clock signal.

5. The method according to claim 1, wherein the deciding whether to save the accumulated multiple energy values in at least one of a plurality of peak detectors comprises:
receiving the high-ranked mask signal by a clock signal;
outputting an enable control signal based on the high-ranked mask signal;
deciding an enable status of a register based on the enable control signal;
selecting a present input energy value or a high-ranked energy value based on the enable control signal; and
saving the selected energy value based on the enable status of the register.

6. The method according to claim 5, wherein a high ranked enable control signal is outputted from an enable controller in a high-ranked peak detector.

7. The method according to claim 1, wherein if a next input energy value is within one chip of an input energy value, based on the input energy value, the next input energy value is masked out by the mask signal.

8. A multi-peak detection method of a mobile telecommunication system using a plurality of N energy values and M peak detectors, where M and N are integers satisfying M<N, and wherein the plurality of N energy values are calculated through despreading a plurality I and Q component signals that are received by a receiving end of the mobile telecommunication system, the method comprising:
(a) receiving a single input energy value out of the plurality of energy values using a clock signal;
(b) determining whether to save the input energy value by comparing the input energy value with a first previous energy value in a first peak detector;
(c) outputting a mask signal from a second detector based on the comparison result of the input energy value and the first previous energy value;
(d) determining an enable status of a register in the second detector based on a high-ranked mask signal, the high-ranked mask signal comprising a prior mask signal of the first peak detector;
(e) saving one of the input energy value or the corresponding previous energy value in the register based on an enable control signal when the enable status of the register is enabled;
(f) repeating the steps (c) through (e) from a next peak detector up to the Mth peak detector;
(g) receiving energy values per clock signal, while repeating the steps (b) through (f) up to the Nth energy value; and
(h) outputting the energy values saved in a register of the M detectors when the peak detection is completed up to the Nth energy value.

9. The method according to claim 8, wherein the clock signal is generated in a half ($1;2$) chip unit.

10. The method according to claim 8, wherein one selected energy value out of the plural energy values is saved in the first peak detector, and wherein an energy value inputted one clock before or after the selected energy value that is smaller than the selected energy value is masked out.

11. The method according to claim 8, wherein the mask signal calculated through the comparison of the first peak detector is saved in a delayer of the second peak detector.

12. A multi-peak detector of a mobile telecommunication system, comprising:
means for cumulatively saving a plurality of energy values that are calculated using a matched filter; and
means for outputting newly saved plural energy values out of the accumulated plural energy values, the newly saved plural energy values being outputted based on a high-ranked mask signal and a high-ranked enable control signal,
wherein a number of energy values that are outputted from the means for outputting the newly saved plural energy values is smaller than a number of the accumulated plural energy values because of a maskability of the means for outputting.

13. The device according to claim 12, wherein the means for outputting the newly saved plural energy values comprises a plurality of outputting means.

14. The device according to claim 12, wherein a corresponding index is assigned to each of the accumulated plural energy values.

15. The device according to claim 12, wherein the means for outputting the newly saved plural energy values further comprises:
means for comparing a present input energy value with a previous energy value and for outputting a mask signal;
means for determining an enable control signal according to the mask signal in order to control an enable status of each register; and
means for selecting the present input energy value or a high-ranked energy value based on the enable control signal.

16. The device according to claim 15, further comprising means for temporarily saving the mask signal outputted from the comparing means, and for outputting the mask signal upon the occurrence of a clock signal.

17. The device according to claim 15, wherein the means for outputting comprises a plurality of delaying means for increasing search resolution.

18. An acquisition device in a mobile communication system, comprising:
a filter coupled to receive a plurality of input signals and output despreadling values;
an energy calculator circuit that receives the despreading values and cumulatively stores a corresponding plurality of energy values; and
a multi-peak detector that receives the plurality of energy values and outputs a ranked plurality of M energy values, wherein M is an integer, wherein the multi-peak detector has M peak detectors, wherein at least one of the peak detectors comprises,
a delayer that receives a clock signal and a high-ranked mask signal, a comparator that receives an input energy value and a first previous energy value and outputs a first control signal, a first multiplexer that receives the input energy value and a second previous energy value or a high-ranked energy value, a first register connected to receive an output of the first multiplexer, the clock signal and an enable control signal, and an enable controller that receives an output from the comparator, a delayed high-ranked mask signal from the delayer and a mask signal.

19. The device of claim 18, wherein delayers in second to M peak detectors are coupled to receive an input from first to (M−1) peak detectors, respectively, and wherein a logic gate receives an output signal from each of the M delayers and generates a second control signal.

* * * * *